3,328,824
BROOM AND HANDLE ATTACHING MEANS
THEREFOR
Raymond E. Chalfant, 5536 North Drive,
Alexandria, La. 71303
Filed Sept. 3, 1965, Ser. No. 485,031
3 Claims. (Cl. 15—171)

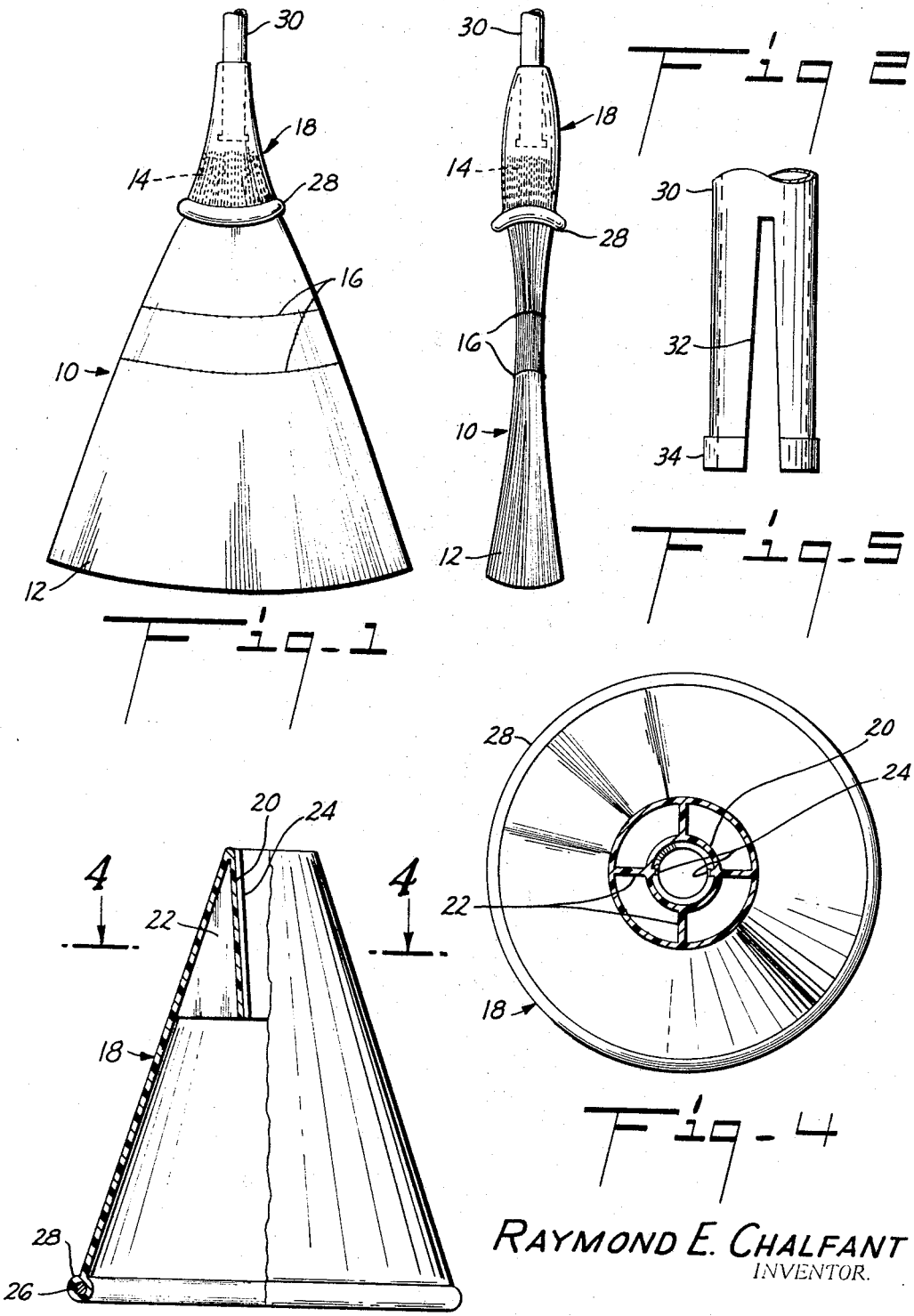

ABSTRACT OF THE DISCLOSURE

A sweeping implement of the broom type and a handle attachment for the same including a cone-shaped member formed with an internal tapered handle receiving socket.

This invention relates to brooms and similar cleaning and sweeping implements, and more particularly to an improved broom structure including handle attaching means therefor.

The invention has for an important object the provision of a broom which may be manufactured in separate parts with the handle detached for convenience in shipping and having means whereby the handle may be quickly and easily attached when desired.

Another object of the invention is to provide a device for use in the manufacture of brooms, which greatly simplifies the assembling of the brush portion of the broom and its attachment to the handle.

A further object of the invention is the provision of a device to be used in the manufacture of brooms which is adapted to be applied to a bundle of broom corn forming the brush of a broom to enclose and clamp the shank portion of the same and by which the handle of the broom may be connected thereto without the use of nails, staples or other similar fastenings.

Another object of the invention is to provide an improved broom which is of simple design and rugged construction and which may be economically manufactured.

The above and other significant objects and advantages of the invention will be apparent from the following detailed description, constituting a specification of the same, when considered in conjunction with the annexed drawings wherein:

FIGURE 1 is a fragmentary front elevational view of of a preferred embodiment of the broom of the invention;

FIGURE 2 is a side elevational view of the same;

FIGURE 3 is a side elevational view, partly broken away and partly in cross-section, and on an enlarged scale, of the improved attaching device or cone of the invention;

FIGURE 4 is a cross-sectional view, taken along the line 4—4 of FIGURE 3, looking in the direction of the arrows; and, FIGURE 5 is a side elevational view, on a greatly enlarged scale of the lower end portion of the handle of the broom of the invention.

Referring now to the drawings in greater detail the invention is illustrated herein in connection with a broom, it being understood that the invention is capable of application in the manufacture of other implements of like purpose, such as mops, brushes, or the like.

The broom of the invention comprises the usual brush-like sweeping member, generally designated 10, formed of a bundle of broom corn, whose lower end portion is of generally fan shape, as indicated at 12, and whose upper end portion is formed into a tapering shank 14, for attachment to the lower end of the broom handle. The brush portion is suitably bound in the usual manner, as by means of rows of stitching 16, to hold the bundle in the desired shape.

The handle attaching means, or cone of the broom, illustrated in detail in FIGURES 3 and 4, comprise a unitary structure, generally designated 18, formed of molded plastic, or the like, of generally cone shape, having at its upper end an internal, downwardly tapering socket portion 20, which is connected to the conical wall of the device by internal, radially extending reinforcing webs 22, to hold the socket rigidly in centralized position relative to the structure. Diametrically disposed, longitudinally extending internal ribs 24 are formed in the socket, which serve as keys, for the attachment of the broom handle, in a manner to be hereinafter described.

The attachment member or cone is provided at its lower end with a reinforcing element or ring 26, embedded in an annular bead 28, such reinforcement being preferably formed of iron wire, or the like, capable of being readily deformed to clamp the brush portion of the broom therein.

The handle 30 of the broom may be of tubular or other suitable shape, formed at its lower end with elongated, longitudinally upwardly tapering side slots 32, and having at its lower extremity an external peripheral flange or bead 34, through which the side slots 32 extend.

In making the broom head or brush, the shank portion 14 of the bundle of broom corn is inserted in the lower end of the attaching cone, with or without the use of a suitable adhesive, and ring 26 is flattened by pressure to deform the ring into clamping engagement with the shank to securely hold the brush in the cone. When so flattened the ring of the cone will be shaped as shown in FIGURES 1 and 2 to engage the bundle of broom corn to securely confine the shank portion 14 of the bundle in the cone, with the upper end of the shank positioned below the socket 20.

With the broom head thus assembled the lower end of the broom handle 30 may then be readily inserted in the upper end of the socket 20, with the internal ribs 24 extending into the side slots 32 of the handle, whereupon the handle may be forced downwardly in the socket, until the lower end flange or bead 34 passes out of the lower end of the socket, the lower end of the handle being then expanded somewhat, to engage the flange 34 with the lower end of the socket to securely hold the handle in the socket.

By constructing the broom, as described above, with the head and handle as separate parts, it will be apparent that the brooms may be formed into a compact package for shipping and the handles may be later inserted to complete the assembly. Moreover, by forming the attaching means or cones 18 of suitable tough, durable plastic material, the same may be used in forming the broom heads, as described above, by deforming the reinforcing ring 26 into engagement with the upper end portion of the brush, the cone being thus shaped to enclose the shank portion of the brush and to form a secure connection for the broom handle.

It will, of course, be understood that the attaching means of the invention may also be used for the manufacture of other implements, such as brushes or mops, by positioning the bristles of brushes or the strands of mops in the lower portion of the cone and applying pressure to the reinforcing ring to engage the cone securely with the bristles or strands to form a connection for the handle.

The handle attaching means of the invention may, if desired, be employed with broom handles of the ordinary type, by inserting the lower end of the handle into the socket 20 and securing the same in place by nailing or the use of other suitable fastening means.

It will thus be seen that the invention, constructed and assembled as described above, provides an improved broom structure which is easily manufactured, and wherein the handle and brush portions may be furnished as separate elements for the purpose of compactness in shipping, and to allow the handles to be readily attached when desired.

The invention is disclosed herein in connection with certain specific embodiments of the parts thereof, which it will be understood are intended by way of example only, it being apparent that various changes can be made in the construction and arrangement of the parts, within the spirit of the invention and the scope of the appended claims.

Having thus clearly shown and described the invention, what is claimed as new and desired to secure by Letters Patent, is:

1. In a broom the combination with a sweeping member having a lower end portion of generally fan shape and an upper end shank portion, of a hollow handle attaching member having an upwardly tapering, generally cone-shaped wall surrounding and in clamping engagement with said shank portion, a centrally disposed downwardly tapering, handle receiving socket formed in the upper end portion of said attaching member and having internal, oppositely inwardly extending ribs therein, longitudinally extending, radially disposed webs located between and connecting said socket and wall, a handle having a lower end portion adapted to be extended through said socket and shaped for coaction with said ribs to hold the handle and attaching member against relative rotation and means on said handle positioned for engagement with said socket to prevent withdrawal of the handle from the socket.

2. In a broom the combination with a sweeping member having a lower end portion of generally fan shape and an upper end shank portion, of a handle attaching member surrounding and in clamping engagement with said shank portion, a centrally disposed downwardly tapering tubular handle receiving socket formed in said attaching member and having internal, oppositely inwardly extending ribs therein, a tubular handle having a lower end portion adapted to be extended through said socket and formed with longitudinally extending, opposite side slots positioned to receive said ribs, and external flange means on said handle positioned for engagement with the lower end of said socket to prevent withdrawal of the handle from the socket.

3. A device for attaching a handle to a broom comprising a hollow, upwardly tapering, thin-walled cone-shaped member formed of flexible material having a centrally disposed, inwardly tapering thin-walled socket formed in its upper end, longitudinally extending, radially disposed web means located between and connecting together said member and socket, said member having a metal ring concentrically disposed on its lower end.

References Cited

UNITED STATES PATENTS

| | | | |
|---|---|---|---|
| 53,962 | 4/1866 | Elkins | 15—171 |
| 62,768 | 3/1867 | Miller et al. | 15—171 |
| 1,064,271 | 6/1913 | Williamson | 15—171 |
| 2,059,530 | 11/1936 | Lay | 15—192 X |
| 2,402,577 | 6/1946 | Rodgers | 15—145 X |
| 2,704,853 | 3/1955 | Gantz | 15—171 X |
| 3,187,363 | 6/1965 | Auwarter | 15—229.1 |

FOREIGN PATENTS

| | | |
|---|---|---|
| 9,345 | 1913 | Great Britain. |
| 806,329 | 12/1958 | Great Britain. |

CHARLES A. WILLMUTH, *Primary Examiner.*

PETER FELDMAN, *Assistant Examiner.*